US012386299B2

(12) United States Patent
Aoki

(10) Patent No.: US 12,386,299 B2
(45) Date of Patent: Aug. 12, 2025

(54) POWER CONTROL APPARATUS, IMAGE FORMING APPARATUS, POWER CONTROL METHOD, AND NON-TRANSITORY COMPUTER-EXECUTABLE MEDIUM

(71) Applicant: Toshimasa Aoki, Kanagawa (JP)

(72) Inventor: Toshimasa Aoki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 14 days.

(21) Appl. No.: 18/605,843

(22) Filed: Mar. 15, 2024

(65) Prior Publication Data

US 2024/0319646 A1 Sep. 26, 2024

(30) Foreign Application Priority Data

Mar. 23, 2023 (JP) ................................ 2023-047118

(51) Int. Cl.
*G03G 15/00* (2006.01)

(52) U.S. Cl.
CPC ......... *G03G 15/5004* (2013.01); *G03G 15/80* (2013.01); *G03G 2215/00978* (2013.01); *G03G 2215/20* (2013.01)

(58) Field of Classification Search
USPC ............................................................ 399/88
See application file for complete search history.

(56) References Cited

U.S. PATENT DOCUMENTS

2012/0237248 A1 9/2012 Aoki
2015/0147079 A1 5/2015 Iwata et al.
2015/0194899 A1 * 7/2015 Miyamoto ......... G03G 15/5004 399/88
2020/0033763 A1 1/2020 Nakajima

FOREIGN PATENT DOCUMENTS

JP 2019-159237 A 9/2019
JP 2020-016866 A 1/2020

* cited by examiner

*Primary Examiner* — Quana Grainger
(74) *Attorney, Agent, or Firm* — XSENSUS LLP

(57) ABSTRACT

A power control apparatus includes a power detection circuit to detect DC power converted from AC power supplied from a power supply and to be supplied to a control board of an image forming apparatus. The power control apparatus includes circuitry configured to, in response to a first printing operation performed by the image forming apparatus, calculate fluctuations in the DC power in each preset control period from a start of the first printing operation until stabilization of the DC power. The power control apparatus includes, in response to a printing operation subsequent to the first printing operation performed by the image forming apparatus, determine allocation of the AC power to a fixing device of the image forming apparatus in a next preset control period based on power obtained by adding, to the DC power, an average of the fluctuations in a plurality of preset control periods.

9 Claims, 15 Drawing Sheets

FIG. 3A

FIG. 3

| FIG. 3A |
|---|
| FIG. 3B |

TABLE 1

| PRINT SETTINGS | | DF READING | SHEET EJECTION DESTINATION | STORAGE DESTINATION OF FLUCTUATION AMOUNT (Wfa), AND COUNT VALUE (K) |
|---|---|---|---|---|
| COLOR | ONE SIDED | NO READING | IN-BODY SHEET EJECTION | FC_S_001 |
| | | | FIN SHEET EJECTION (NO POST-PROCESSING) | FC_S_002 |
| | | | FIN SHEET EJECTION (WITH POST-PROCESSING) | FC_S_003 |
| | | EQUAL TO OR LESS THAN 300 dpi | IN-BODY SHEET EJECTION | FC_S_004 |
| | | | FIN SHEET EJECTION (NO POST-PROCESSING) | FC_S_005 |
| | | | FIN SHEET EJECTION (WITH POST-PROCESSING) | FC_S_006 |
| | | 400dpi | IN-BODY SHEET EJECTION | FC_S_007 |
| | | | FIN SHEET EJECTION (NO POST-PROCESSING) | FC_S_008 |
| | | | FIN SHEET EJECTION (WITH POST-PROCESSING) | FC_S_009 |
| | | 600dpi | IN-BODY SHEET EJECTION | FC_S_010 |
| | | | FIN SHEET EJECTION (NO POST-PROCESSING) | FC_S_011 |
| | | | FIN SHEET EJECTION (WITH POST-PROCESSING) | FC_S_012 |
| | DU-PLEX | NO READING | IN-BODY SHEET EJECTION | FC_D_001 |
| | | | FIN SHEET EJECTION (NO POST-PROCESSING) | FC_D_002 |
| | | | FIN SHEET EJECTION (WITH POST-PROCESSING) | FC_D_003 |
| | | EQUAL TO OR LESS THAN 300 dpi | IN-BODY SHEET EJECTION | FC_D_004 |
| | | | FIN SHEET EJECTION (NO POST-PROCESSING) | FC_D_005 |
| | | | FIN SHEET EJECTION (WITH POST-PROCESSING) | FC_D_006 |
| | | 400dpi | IN-BODY SHEET EJECTION | FC_D_007 |
| | | | FIN SHEET EJECTION (NO POST-PROCESSING) | FC_D_008 |
| | | | FIN SHEET EJECTION (WITH POST-PROCESSING) | FC_D_009 |
| | | | IN-BODY SHEET EJECTION | FC_D_010 |

FIG. 3B

| | | | | |
|---|---|---|---|---|
| | | 600dpi | FIN SHEET EJECTION (NO POST-PROCESSING) | FC_D_011 |
| | | | FIN SHEET EJECTION (WITH POST-PROCESSING) | FC_D_012 |
| MONO-CHROME | ONE SIDED | NO READING | IN-BODY SHEET EJECTION | BK_S_001 |
| | | | FIN SHEET EJECTION (NO POST-PROCESSING) | BK_S_002 |
| | | | FIN SHEET EJECTION (WITH POST-PROCESSING) | BK_S_003 |
| | | EQUAL TO OR LESS THAN 300 dpi | IN-BODY SHEET EJECTION | BK_S_004 |
| | | | FIN SHEET EJECTION (NO POST-PROCESSING) | BK_S_005 |
| | | | FIN SHEET EJECTION (WITH POST-PROCESSING) | BK_S_006 |
| | | 400dpi | IN-BODY SHEET EJECTION | BK_S_007 |
| | | | FIN SHEET EJECTION (NO POST-PROCESSING) | BK_S_008 |
| | | | FIN SHEET EJECTION (WITH POST-PROCESSING) | BK_S_009 |
| | | 600dpi | IN-BODY SHEET EJECTION | BK_S_010 |
| | | | FIN SHEET EJECTION (NO POST-PROCESSING) | BK_S_011 |
| | | | FIN SHEET EJECTION (WITH POST-PROCESSING) | BK_S_012 |
| | DU-PLEX | NO READING | IN-BODY SHEET EJECTION | BK_D_001 |
| | | | FIN SHEET EJECTION (NO POST-PROCESSING) | BK_D_002 |
| | | | FIN SHEET EJECTION (WITH POST-PROCESSING) | BK_D_003 |
| | | EQUAL TO OR LESS THAN 300 dpi | IN-BODY SHEET EJECTION | BK_D_004 |
| | | | FIN SHEET EJECTION (NO POST-PROCESSING) | BK_D_005 |
| | | | FIN SHEET EJECTION (WITH POST-PROCESSING) | BK_D_006 |
| | | 400dpi | IN-BODY SHEET EJECTION | BK_D_007 |
| | | | FIN SHEET EJECTION (NO POST-PROCESSING) | BK_D_008 |
| | | | FIN SHEET EJECTION (WITH POST-PROCESSING) | BK_D_009 |
| | | 600dpi | IN-BODY SHEET EJECTION | BK_D_010 |
| | | | FIN SHEET EJECTION (NO POST-PROCESSING) | BK_D_011 |
| | | | FIN SHEET EJECTION (WITH POST-PROCESSING) | BK_D_012 |

RELATED ART

WHEN POWER IS RELEASED AT TIMING OF 10 SECONDS ACCORDING TO POWER DETECTION RESULT (185W) OF A, DC POWER REACHES B OF 220W AT THIS TIME, EXCEEDING THE MAXIMUM POWER BY 35W.

| |
|---|
| FIG. 9A |
| FIG. 9B |

POWER CONTROL APPARATUS, IMAGE FORMING APPARATUS, POWER CONTROL METHOD, AND NON-TRANSITORY COMPUTER-EXECUTABLE MEDIUM

CROSS-REFERENCE TO RELATED APPLICATION

This patent application is based on and claims priority pursuant to 35 U.S.C. § 119(a) to Japanese Patent Application No. 2023-047118, filed on Mar. 23, 2023, in the Japan Patent Office, the entire disclosure of which is hereby incorporated by reference herein.

BACKGROUND

Technical Field

Embodiments of the present disclosure relate to a power control apparatus, an image forming apparatus, a power control method, and a non-transitory computer-executable medium.

Related Art

In image forming apparatuses, a technology for controlling power is known. According to such a technology, secondary-side direct current (DC) power is detected during an apparatus operation time such as a printing operation time to reduce alternating current (AC) power in an AC system (primary side) such as power allocated to fixing. Thus, the AC current is prevented from exceeding a rated current on the facility side, a rated current or rated power of the apparatus. However, according to such a power control technology, since the apparatus operation is detected and then power allocated for fixing is reduced, DC power for each apparatus operation status stored in advance is used. For this reason, power is not reduced in accordance with the fluctuation of the DC power in the apparatus operation status. This leads to excessive reduction of the power allocated for fixing.

In view of the above-described drawback, a technology is known according to which secondary-side DC power is detected and power allocated for fixing is determined on the basis of the detection result in order to efficiently supply power to the fixing side.

SUMMARY

According to an embodiment of the present disclosure, a power control apparatus includes a power detection circuit and circuitry. The power detection circuit detects direct current (DC) power converted from alternating current (AC) power supplied from a power supply and to be supplied to a control board of an image forming apparatus. The circuitry, in response to a first printing operation performed by the image forming apparatus, calculates fluctuations in the DC power in each preset control period from a start of the first printing operation until stabilization of the DC power. The circuitry, in response to a printing operation subsequent to the first printing operation performed by the image forming apparatus, determines allocation of the AC power to a fixing device of the image forming apparatus in a next preset control period based on power obtained by adding, to the DC power, an average of the fluctuations in a plurality of preset control periods.

According to an embodiment of the present disclosure, an image forming apparatus includes the above-described power control apparatus.

According to an embodiment of the present disclosure, a power control method performed by a power control apparatus includes detecting DC power converted from AC power supplied from a power supply and to be supplied to a control board of an image forming apparatus. The power control method includes, in response to a first printing operation performed by the image forming apparatus, calculating fluctuations in the DC power in each preset control period from a start of the first printing operation until stabilization of the DC power. The power control method includes, in response to a printing operation subsequent to the first printing operation performed by the image forming apparatus, determining allocation of the AC power to a fixing device of the image forming apparatus in a next preset control period based on power obtained by adding, to the DC power, an average of the fluctuations in a plurality of preset control periods.

According to an embodiment of the present disclosure, a non-transitory computer-executable medium stores a plurality of instructions which, when executed by one or more processors, cause the one or more processors to perform a power control method. The power control method includes acquiring a result of detecting DC power converted from AC power supplied from a power supply and to be supplied to a control board of an image forming apparatus. The power control method includes, in response to a first printing operation performed by the image forming apparatus, calculating fluctuations in the DC power in each preset control period from a start of the first printing operation until stabilization of the DC power. The power control method includes, in response to a printing operation subsequent to the first printing operation performed by the image forming apparatus, determining allocation of the AC power to a fixing device of the image forming apparatus in a next preset control period based on power obtained by adding, to the DC power, an average of the fluctuations in a plurality of preset control periods.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIGS. 3A and 3B (FIG. 3) are a table stored in a storage unit in which calculated amounts of fluctuation or a storage destination in which the calculated amounts of fluctuation are stored are associated with print modes, according to an embodiment of the present disclosure;

Figure 1:
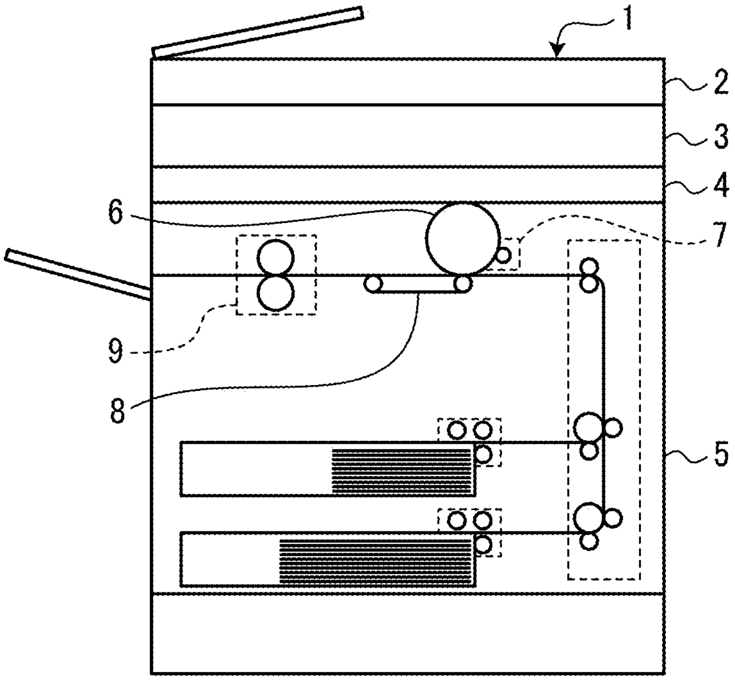
FIG. 1 is a diagram illustrating a configuration of an image forming apparatus according to Embodiment 1 of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is now given in detail of embodiments of a power control apparatus, an image forming apparatus, a power control method, and a program with reference to the accompanying drawings.

Embodiment 1

FIG. 1 is a diagram illustrating an example of a configuration of an image forming apparatus according to Embodiment 1. As illustrated in FIG. 1, an image forming apparatus 1 according to the present embodiment is, for example, a digital multifunction peripheral, and has functions such as a copier function, a printer function, and a facsimile function. The image forming apparatus 1 according to the present embodiment includes a control panel including an application (or mode) switch key that receives an operation for sequentially switching and selecting the copier function, the printer function, and the facsimile function. The image forming apparatus 1 operates in a copy mode when the copier function is selected, operates in a printer mode when the printer function is selected, and operates in a facsimile mode when the facsimile function is selected.

With reference to FIG. 1, a brief description is given of a flow of image formation by the image forming apparatus 1 according to the present embodiment, taking the copy mode as an example. In the copy mode, an automatic document feeder (ADF) 2 feeds documents of a document bundle one by one to an image reading device 3, and the image reading device 3 reads image information. A writing unit 4 as a writing means converts the read image information into optical information via an image processing means. A photoconductor drum 6 is uniformly charged by a charger, and then exposed to the optical information from the writing unit 4. Thus, an electrostatic latent image is formed. The electrostatic latent image on the photoconductor drum 6 is developed by a developing device 7 into a toner image. The toner image is transferred from a conveyance belt 8 to a transfer sheet that is fed from a sheet feeder unit to the conveyance belt 8. The photoconductor drum 6, the developing device 7, and the conveyance belt 8 serve as an image forming device to form an image. After this operation, the toner image is fixed on the transfer paper by a fixing device 9, and the transfer paper is ejected.

Figure 2:
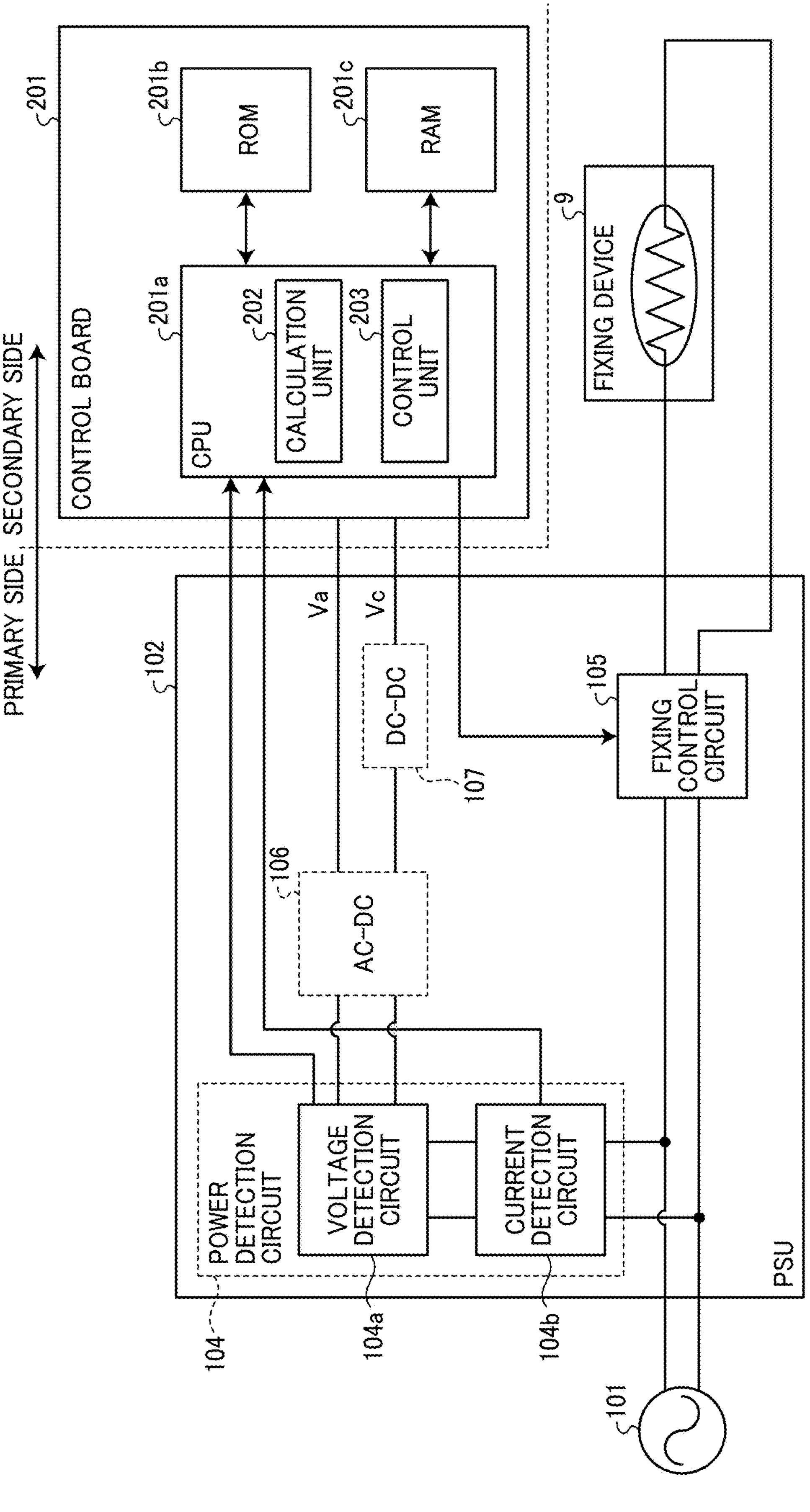
FIG. 2 is a diagram illustrating a circuit configuration of the image forming apparatus, according to Embodiment 1 of the present disclosure.

FIG. 2 is a diagram illustrating an example of a circuit configuration of the image forming apparatus 1 according to Embodiment 1. As illustrated in FIG. 2, the circuit configuration of the image forming apparatus 1 according to the present embodiment is divided into a primary-side circuit and a secondary-side circuit. A power supply 101, a power supply unit (PSU) 102, and the fixing device 9 are provided on the primary-side circuit. A control board 201 is provided on the secondary-side circuit.

A power detection circuit 104, a fixing control circuit 105, an alternating current (AC)-direct current (DC) conversion unit 106, and a DC-DC conversion unit 107, are mounted on the PSU 102. A central processing unit (CPU) 201*a*, a read-only memory (ROM) 201*b*, and a random-access memory (RAM) 201*c* are mounted on the control board 201.

The AC-DC conversion unit 106 converts AC power supplied from the power supply 101 into DC power and supplies the DC power to the control board 201. The DC-DC conversion unit 107 converts the voltage of the DC power converted from the AC power by the AC-DC conversion unit 106 and supplies the DC power to the control board 201. The fixing control circuit 105 is mounted on, for example, the PSU 102, and switches between the energized mode and the de-energized mode of the fixing device 9 in accordance with a signal from the CPU 201*a* of the control board 201.

The power detection circuit 104 is an example of a power detection unit to detect the DC power supplied to the control board 201. In the present embodiment, the power detection circuit 104 includes a current detection circuit 104*b* and a voltage detection circuit 104*a*, and is mounted on the PSU 102. The current detection circuit 104*b* detects current consumption during operation of the image forming apparatus 1. The voltage detection circuit 104*a* detects power supply voltages Va and Vc of a power supply environment (i.e., the power supply 101). The power detection circuit 104 detects power consumption (DC power) during operation of the image forming apparatus 1.

The detected power supply voltages Va and Vc, current consumption, and power consumption are subjected to analog/digital (A/D) conversion by the CPU 201*a* on the control board 201, and stored in, for example, the ROM 201*b* or the RAM 201*c*. The ROM 201*b* and the RAM 201*c* further stores, for example, power consumption detected at the time of the first printing operation by the image forming apparatus 1, power supply voltages Va and Vc, a detected current, power information provided in advance.

The CPU 201*a* controls an ON/OFF signal to be sent to the fixing control circuit 105 on the basis of the power consumption at the time of the first printing operation by the image forming apparatus 1 stored in the ROM 201*b* and the RAM 201*c* in accordance with a time when the control of the fixing device 9 is started to change the pattern of the energization to the fixing device 9.

Specifically, the CPU 201*a* includes a calculation unit 202 and a control unit 203. The calculation unit 202 acquires the detection result of DC power detected by the power detection circuit 104. Further, the calculation unit 202 calculates fluctuations in the DC power from the start of the printing operation to the stabilization of the DC power respectively for multiple preset control periods (i.e., fixing control periods) when the first printing operation is performed in the image forming apparatus 1. The calculation unit 202 serves as a calculation unit according to an embodiment of the present disclosure. Furthermore, the calculation unit 202 stores the amounts of fluctuation calculated respectively for the fixing control periods in a storage unit such as the RAM 201*c*. In the present embodiment, the calculation unit 202 may determine that the DC power gets stable from the start of the printing operation when the amount of fluctuation in the DC power is within a preset amount of fluctuation in power. The preset amount of fluctuation in power serves as a predetermined amount of fluctuation in power according to an embodiment of the present disclosure.

Further, in the present embodiment, the calculation unit 202 may calculate the amounts of fluctuation respectively for multiple print modes having different power consumption patterns at the start of the printing operation. Such a configuration can calculate multiple amounts of fluctuation in accordance with the power consumption patterns at the start of the printing operation, which vary depending on the print mode and the configuration of the image forming apparatus 1 and record the calculated amounts of fluctuation. Thus, power allocated for fixing can be controlled in accordance with the power consumption pattern. In the present embodiment, the print mode may be, for example, a combination of print settings, a document feeder (DF) reading, and a sheet ejection destination. Further, the calculation unit 202 may store the calculated amounts of fluctuation or the storage destination in which the calculated amounts of fluctuation are stored in a storage unit such as the RAM 201*c* in association with the print modes as illustrated in Table 1 of FIGS. 3A and 3B (FIG. 3).

When a printing operation subsequent to the first printing operation is performed in the image forming apparatus 1, the control unit 203 determines the allocation of AC power of the next fixing control period to the fixing device 9 on the basis of power obtained by adding the average of the amounts of fluctuation of the fixing control periods to the DC power. The control unit 203 serves as a control unit according to an embodiment of the present disclosure. Thus, AC power to the fixing device 9 (i.e., power allocated to fixing) is determined by correcting the fluctuation, which increases over time, in the DC power at the start of printing with a linear form obtained from the detection result of the DC power at the time of the first printing operation. This prevents the total of the primary-side AC power and the secondary-side DC power from exceeding the maximum power in the actual printing operation.

Figure 4:
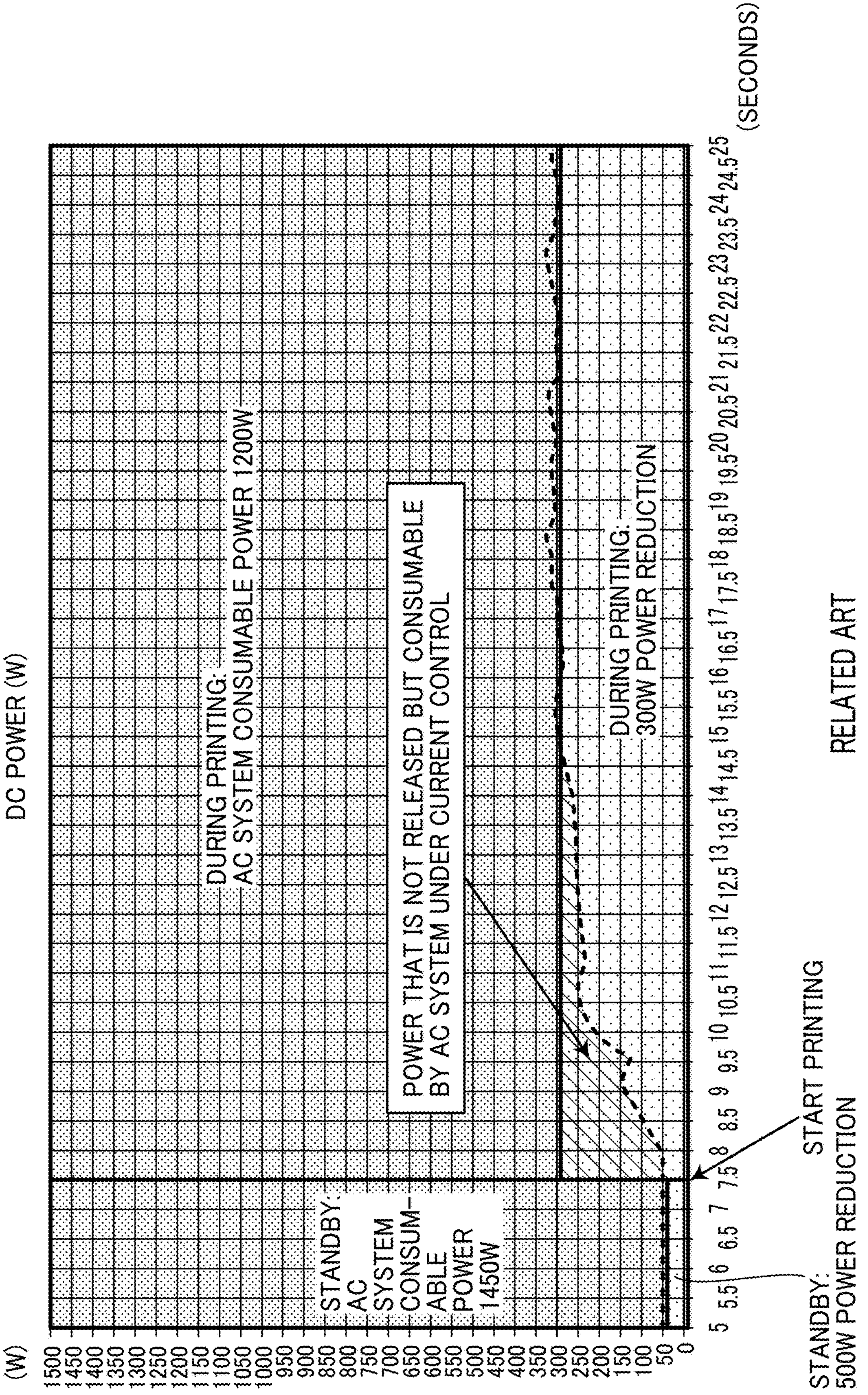
FIG. 4 is a diagram for describing an example of a process of determining power allocated to fixing in the image forming apparatus, according to Embodiment 1 of the present disclosure.
Figure 5:
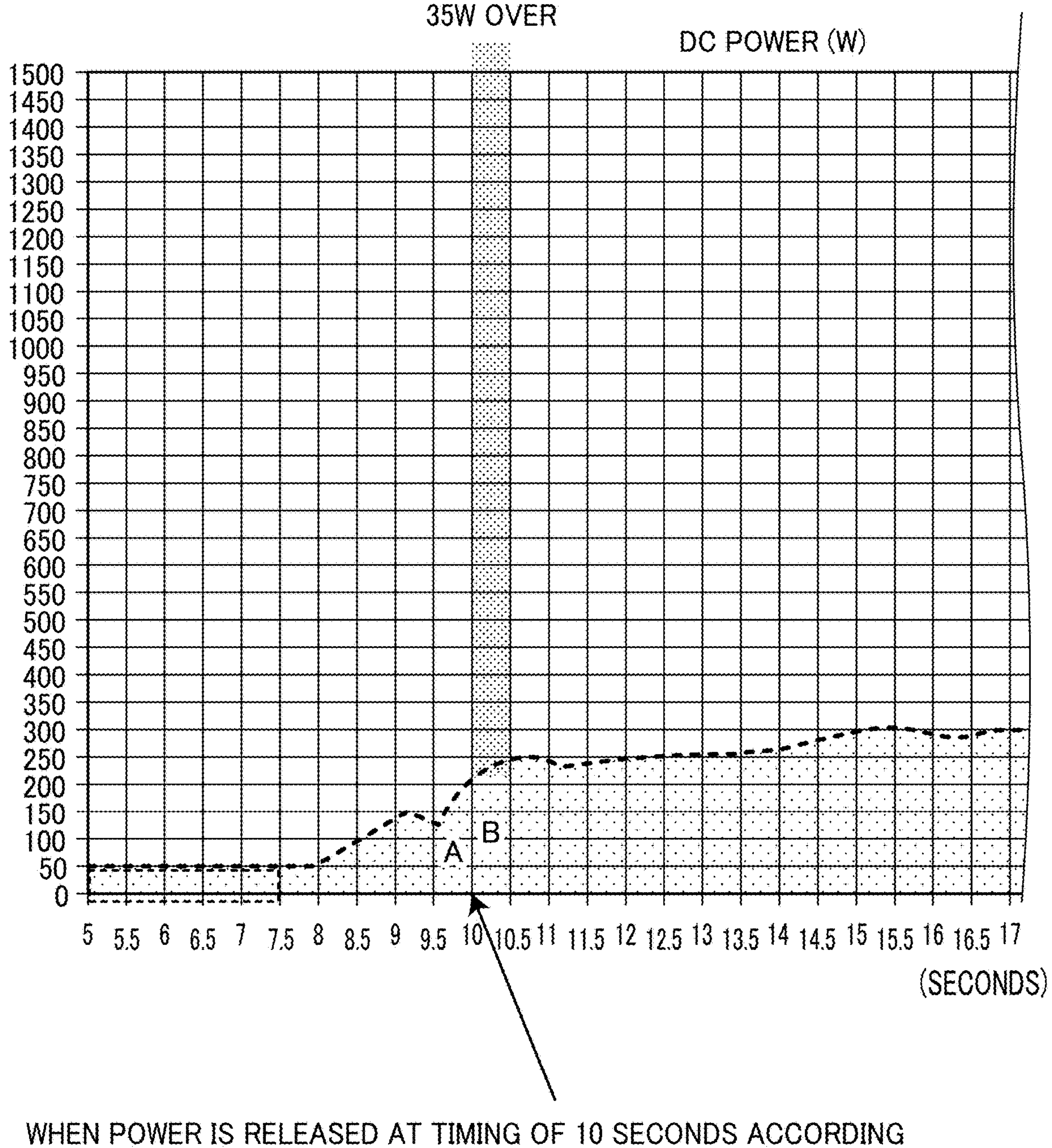
FIG. 5 is a diagram for describing an example of a process of determining power allocated to fixing in the image forming apparatus, according to Embodiment 1 of the present disclosure.
Figure 6:
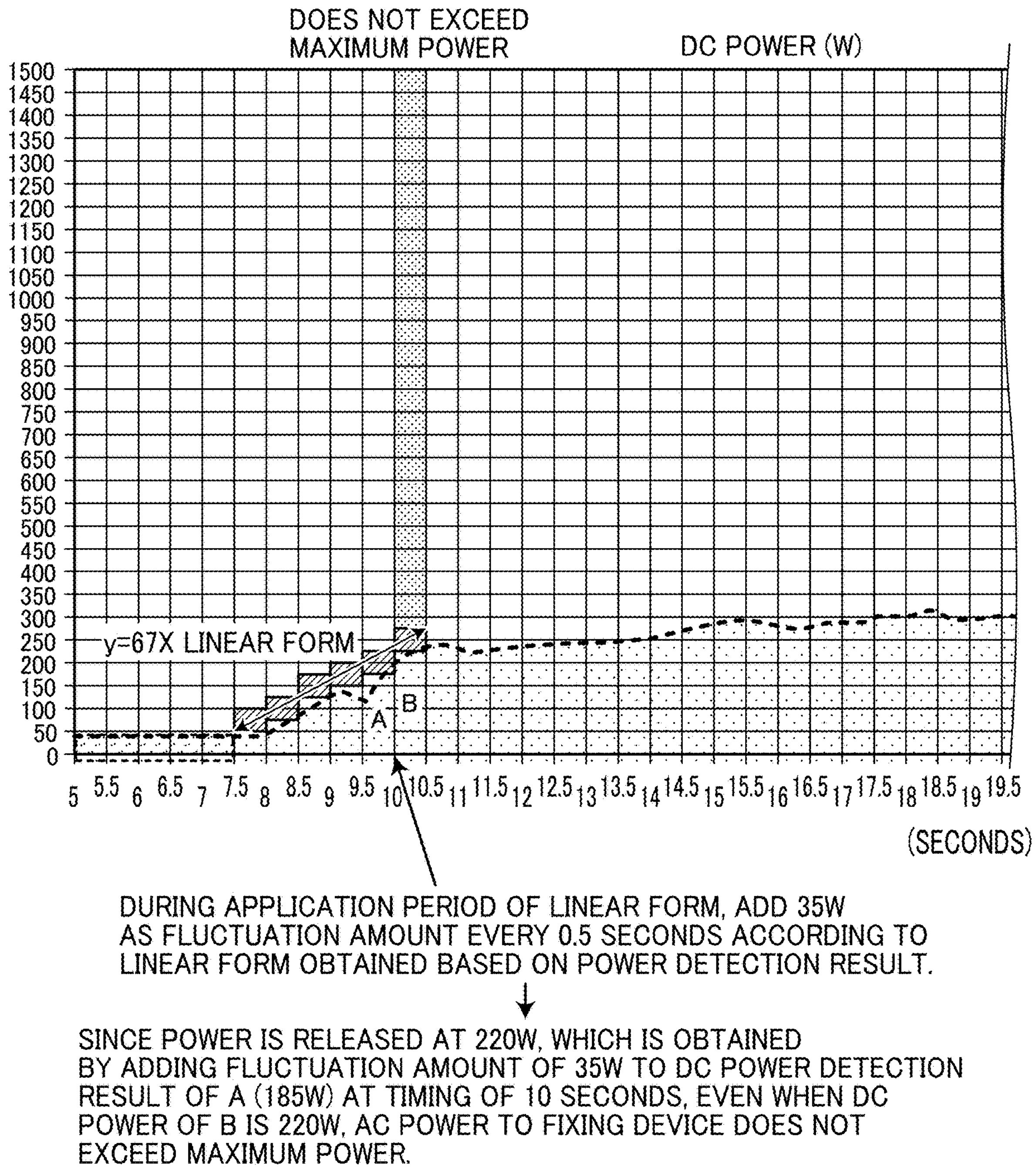
FIG. 6 is a diagram for describing an example of a process of determining power allocated to fixing in the image forming apparatus, according to Embodiment 1 of the present disclosure.

FIG. 4 to FIG. 6 are diagrams for describing an example of a process of determining the power allocated to fixing in the image forming apparatus 1 according to Embodiment 1. In FIG. 4 to FIG. 6, the vertical axis represents power, and the horizontal axis represents elapsed time from the start of the printing operation.

As illustrated in FIG. 4, in image forming apparatuses, a power control technology is known in the art according to which the secondary-side DC power during an apparatus operation such as a printing operation is detected and AC power consumed in an AC system (primary side) is reduced so that the AC power does not exceed a rated current on the facility side, a rated current of the apparatus, or rated power.

However, in the power control technology according to the related art, DC power (e.g., 300 W) for each apparatus operation status such as during a printing operation stored in advance is used. Since the power cannot be reduced in accordance with the fluctuation of the DC power in the apparatus operating status, the power allocated to fixing (e.g., 1200 W) is excessively reduced.

In view of such a drawback, as illustrated in FIG. 5, a technology has been developed that, in order to efficiently supply AC power to the fixing device, detects the secondary-side DC power and determines power allocated to fixing on the basis of the detection result. This technology brings about no issue in a time period when the secondary-side DC power is stable. However, this technology does not take into consideration a time lag from detection at the start of printing to determination of the power allocated to fixing. At the start of printing, the secondary-side DC power fluctuates. For example, the secondary-side DC power increases over time. Accordingly, if the power allocated to fixing is determined on the basis of the detection result of the DC power, the total of the primary-side AC power and the secondary-side DC power may exceed the maximum power at some times in the actual operation.

By contrast, in the image forming apparatus 1 according to the present embodiment, the control unit 203 adds the average of the amounts of fluctuation for multiple fixing control periods obtained in advance from the detection result of the DC power to the DC power in a time period during which the DC power linearly increases (i.e., a time period from the start of the printing operation until the stabilization of the DC power). For example, as illustrated in FIG. 6, the control unit 203 releases the AC power to the fixing device 9 on the basis of 220 W obtained by adding 35 W which is the amount of fluctuation to the detection result (e.g., 185 W) of the DC power in a fixing control period A, at the timing of a fixing control period B which is 10 seconds after the fixing control period A. Accordingly, even when the DC power is 220 W in the fixing control period B, the total of the primary-side AC power and the secondary-side DC power is prevented from exceeding the maximum power.

Figure 7A:
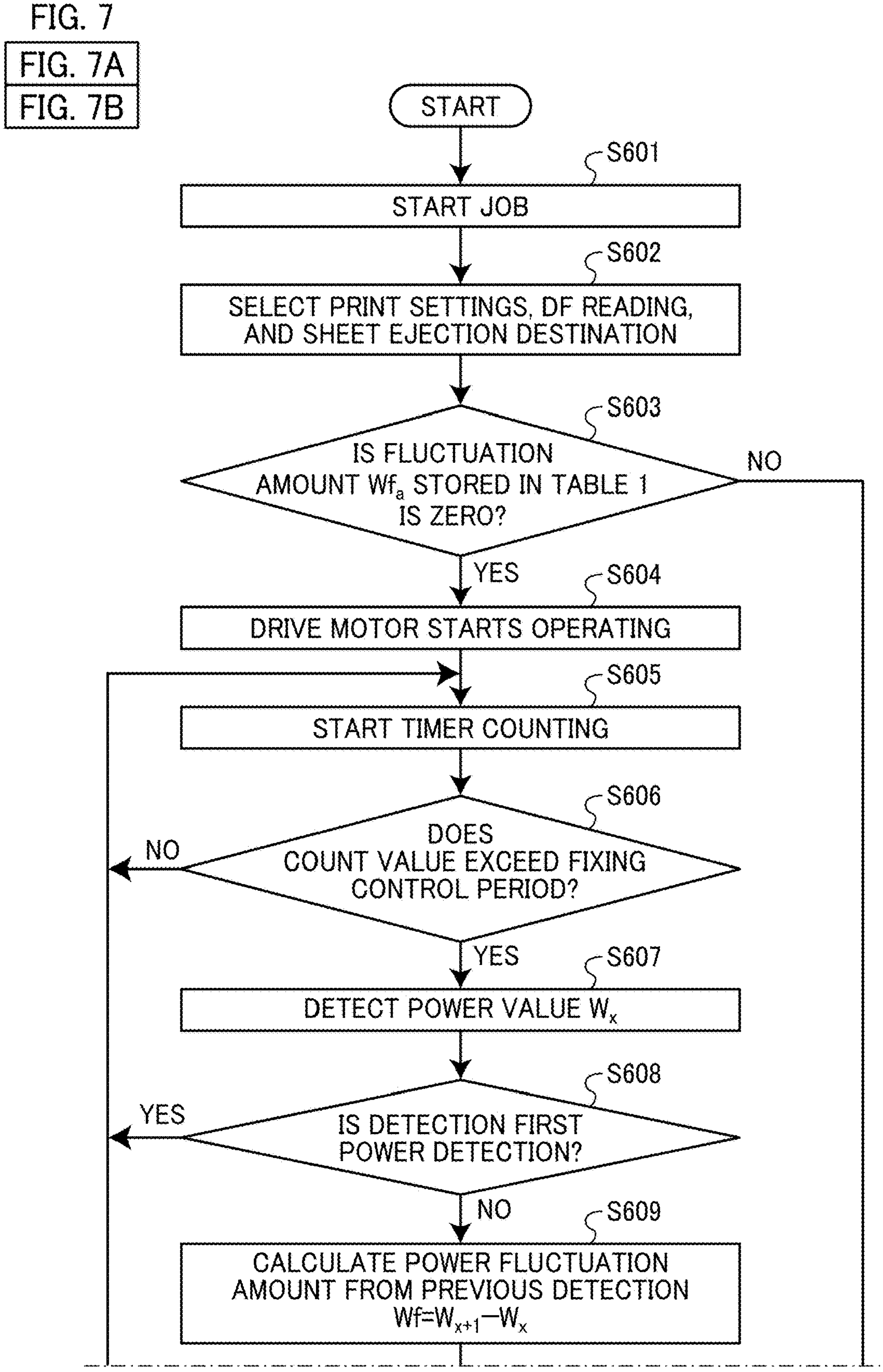
FIGS. 7A and 7B (FIG. 7) are a flowchart of an example of a flow of a process of calculating an amount of fluctuation in DC power in the image forming apparatus, according to Embodiment 1 of the present disclosure.
Figure 7B:
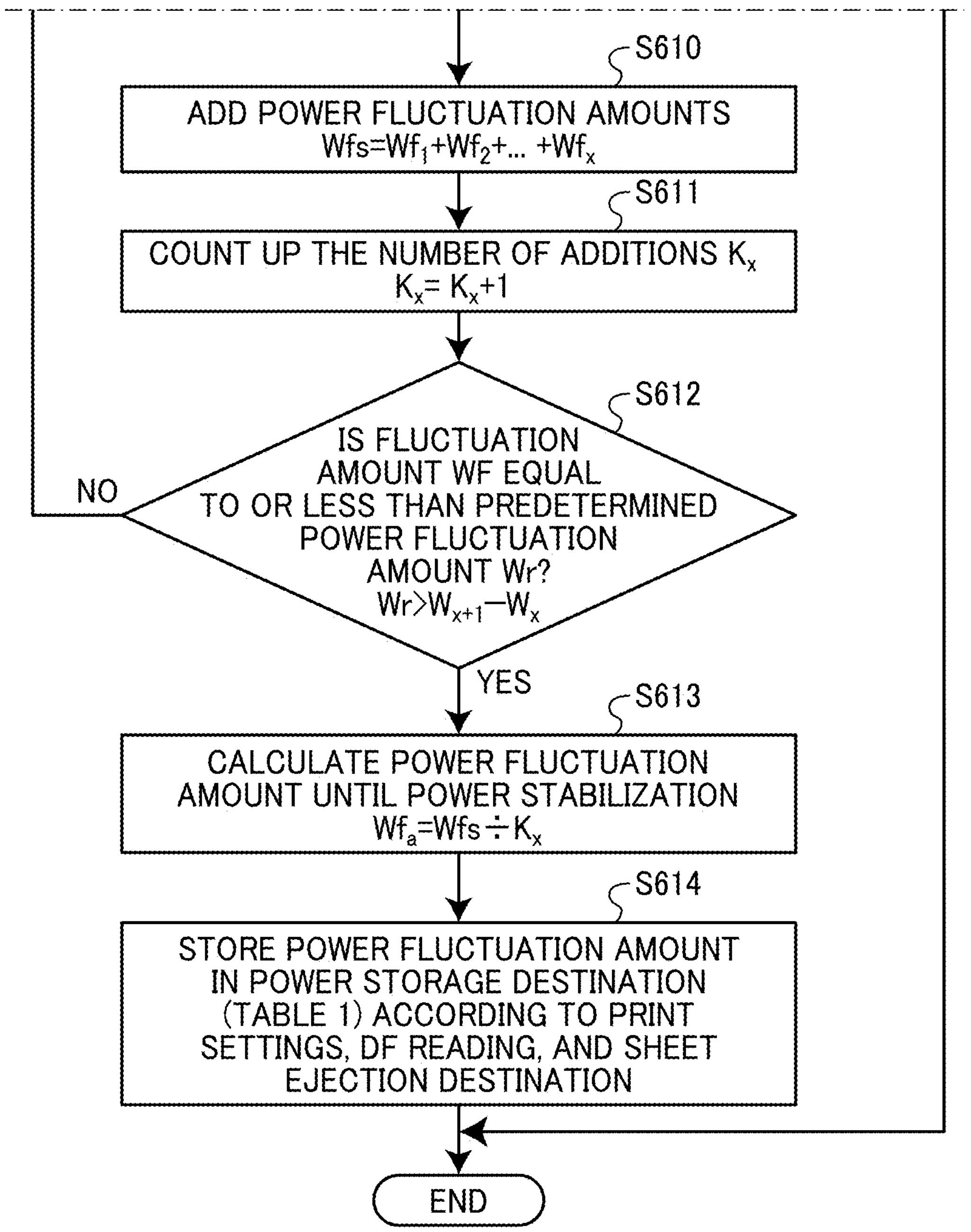

FIGS. 7A and 7B (FIG. 7) are a flowchart of an example of a flow of a process of calculating the amount of fluctuation in DC power in the image forming apparatus 1, according to Embodiment 1. When a job (printing operation) in the image forming apparatus 1 is started (step S601), the calculation unit 202 selects a print mode including, for example, print settings, a DF reading, and a sheet ejection destination (step S602).

Subsequently, the calculation unit 202 determines whether the amount of fluctuation of DC power $Wf_a$ in the selected print mode is stored (step S603). In other words, the calculation unit 202 determines whether $Wf_a=0$. When the calculation unit 202 determines that the amount of fluctuation $Wf_a$ in the selected print mode is stored (step S603: No), the process of calculating the amount of fluctuation ends.

When the calculation unit 202 determines that the amount of fluctuation $Wf_a$ in the selected print mode is not stored (step S603: Yes), in response to the start of the operation of the drive motor of, for example, the fixing device 9 (step S604), the calculation unit 202 starts counting a timer (step S605). Subsequently, the calculation unit 202 determines whether the count value of the timer count exceeds the fixing control period (step S606). When the calculation unit 202 determines that the count value does not exceed the fixing control period (step S606: No), the process returns to step S605.

When the calculation unit 202 determines that the count value exceeds the fixing control period (step S606: Yes), the power detection circuit 104 detects DC power (power value $W_x$) supplied to the control board 201 (step S607). Subsequently, the calculation unit 202 determines whether the detection of the DC power is the first detection in the selected print mode (step S608). When the calculation unit 202 determines that the DC power detection is the first detection (step S608: Yes), the process returns to step S605, and the calculation unit 202 continues counting the timer.

By contrast, when the calculation unit 202 determines that the detection of the DC power is not the first detection (step S608: No), the calculation unit 202 calculates the amount of fluctuation Wf from the previous power value $W_x$ to the power value $W_{x+1}$ (step S609). Further, the calculation unit 202 calculates the amount of fluctuation Wfs by adding the amounts of fluctuation Wf calculated in the selected print mode (step S610). Further, the calculation unit 202 counts up the number of additions $K_x$ of the amount of fluctuation Wf (step S611).

Subsequently, the calculation unit 202 determines whether the amount of fluctuation Wf is equal to or less than a preset amount of power fluctuation Wr (step S612). When the amount of fluctuation Wf is larger than the preset amount of power fluctuation Wr (step S612: No), the calculation unit 202 determines that DC power supplied to the control board 201 is not stable. Then, the process returns to step S605, and the calculation unit 202 continues counting the timer.

When the amount of fluctuation Wf is equal to or less than the preset amount of power fluctuation Wr (step S612: Yes), the calculation unit 202 determines that DC power supplied to the control board 201 is stabilized. Then, the calculation unit 202 divides the amount of fluctuation Wfs by the number of additions $K_x$ to calculate the amount of fluctuation $Wf_a$, which is the amount of fluctuation until the DC power is stabilized (step S613). Then, the calculation unit 202 stores the calculated amount of fluctuation $Wf_a$ in association with the selected print mode in a storage unit such as the RAM 201*c* (step S614).

Figure 8A:
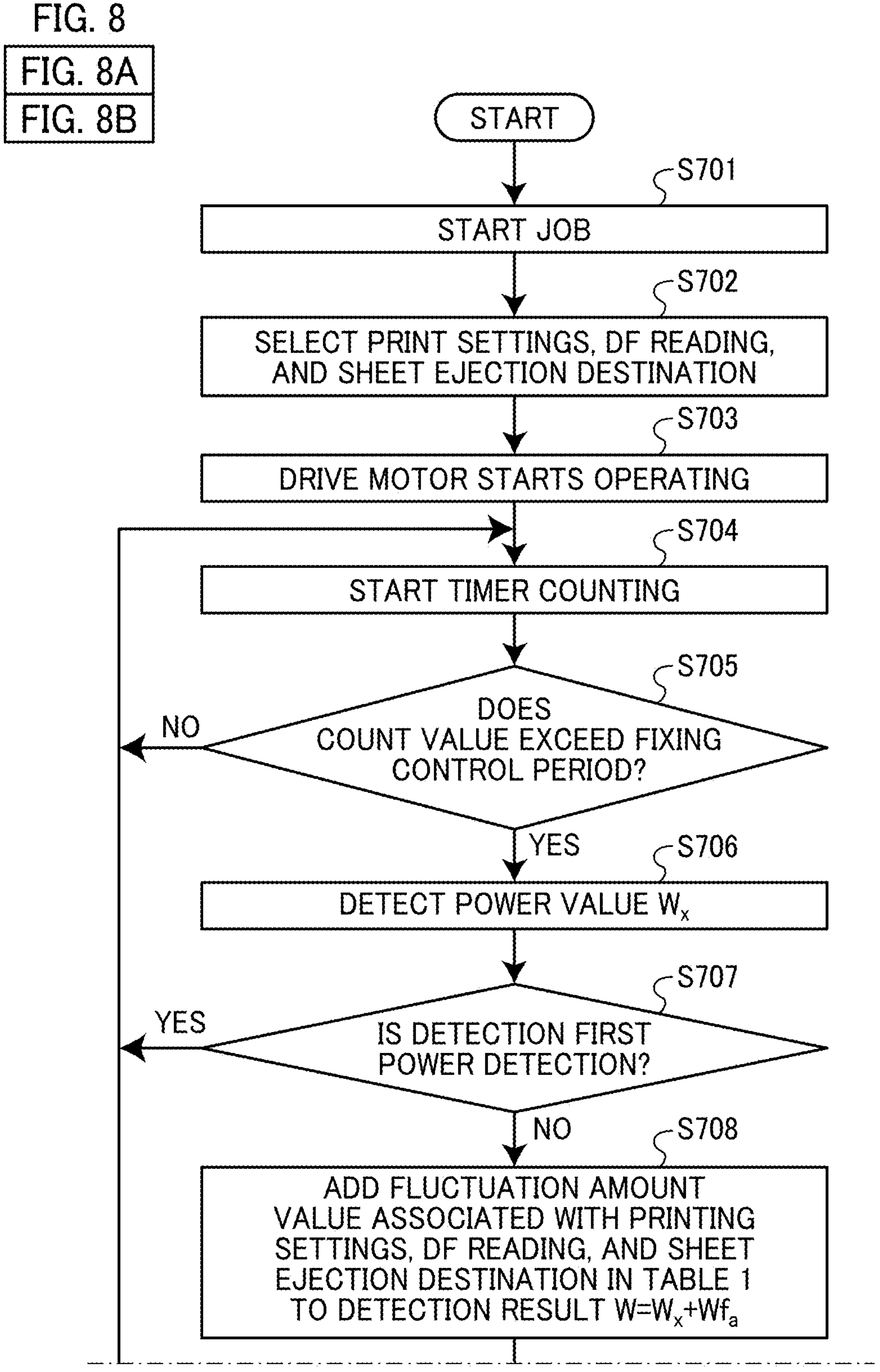
FIGS. 8A and 8B (FIG. 8) are a flowchart of an example of a flow of a process of determining power allocated to fixing in the image forming apparatus, according to Embodiment 1 of the present disclosure.
Figure 8B:
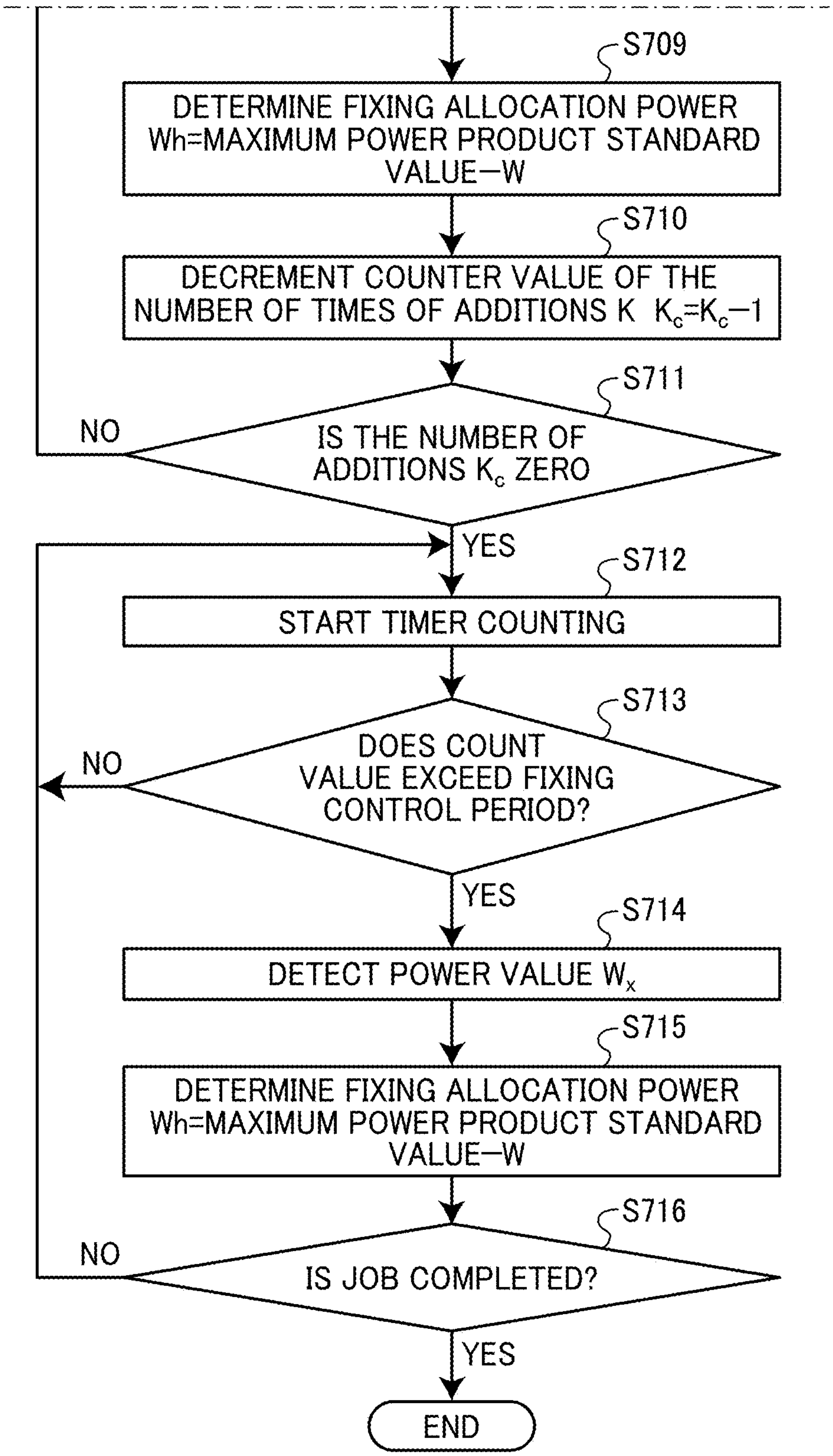

FIGS. 8A and 8B (FIG. 8) is a flowchart of an example of a flow of a process of determining power allocated to fixing in the image forming apparatus 1, according to Embodiment 1. When a job (printing operation) in the image forming apparatus 1 is started (step S701), the calculation unit 202 selects a print mode including, for example, print settings, a DF reading, and a sheet ejection destination (step S702).

Subsequently, in response to the operation of the drive motor (step S703), the calculation unit 202 starts counting a timer (step S704). Then, the calculation unit 202 determines whether the count value of the timer count exceeds the fixing control period (step S705). When the calculation unit 202 determines that the count value does not exceed the fixing control period (step S705: No), the process returns to step S704.

When the calculation unit 202 determines that the count value exceeds the fixing control period (step S705: Yes), the power detection circuit 104 detects DC power (power value $W_x$) supplied to the control board 201 (step S706). Subsequently, the calculation unit 202 determines whether the detection of the DC power is the first detection in the selected print mode (step S707). When the calculation unit 202 determines that the DC power detection is the first detection (step S707: Yes), the process returns to step S704, and the calculation unit 202 continues counting the timer.

By contrast, when the calculation unit 202 determines that the DC power detection is not the first detection (step S707: No), the calculation unit 202 calculates power W by adding the amount of fluctuation $Wf_a$ that is stored in the storage unit such as the RAM 201*c* in association with the print mode to the detected DC power value $W_x$ (step S708). Further, the control unit 203 subtracts the calculated power W from the maximum power product standard value to determine power allocated to fixing (step S709). Furthermore, the calculation unit 202 decrements the counter value of the number of additions $K_c$ (step S710).

Subsequently, the calculation unit 202 determines whether the number of additions $K_c$ is zero (step S711). When the calculation unit 202 determines that the number of additions Kc is not zero (step S711: No), the process returns to step S704. By contrast, when the calculation unit 202 determines that the number of additions $K_c$ is zero (step S711: Yes), the calculation unit 202 starts counting the timer (step S712). Then, the calculation unit 202 determines whether the count value of the timer count exceeds the fixing control period (step S713). When the calculation unit 202 determines that the count value exceeds the fixing control period (step S713: Yes), the power detection circuit 104 detects DC power (power value $W_x$) supplied to the control board 201 (step S714).

Subsequently, the control unit 203 subtracts the detected power value $W_x$ from the maximum power product standard value to determine power allocated to fixing (step S715). Then, the calculation unit 202 determines whether the job is already completed (step S716). When the calculation unit 202 determines that the job is not completed yet (step S716: No), the process returns to step S712. By contrast, when the job is completed (step S716: Yes), the calculation unit 202 ends the process of determining power allocated to fixing.

As described heretofore, the image forming apparatus 1 according to Embodiment 1 determines the AC power to the fixing device 9 (i.e., the power allocated to fixing) by correcting the fluctuation, which increases over time, in the DC power at the start of printing with a linear form obtained from the detection result of the DC power at the time of the first printing operation. This prevents the total of the primary-side AC power and the secondary-side DC power from exceeding the maximum power in the actual printing operation.

Embodiment 2

The present embodiment relates to a case in which it is determined that DC power is stabilized from the start of the printing operation when DC power supplied to the control board is lower than DC power in the previous fixing control period. Redundant descriptions of the same configurations as those described above in Embodiment 1 may be omitted below.

In the present embodiment, the calculation unit 202 determines that DC power is stabilized from the start of the printing operation, when DC power supplied to the control board 201 is lower than DC power in the previous fixing control period.

Figures 9, 9A:
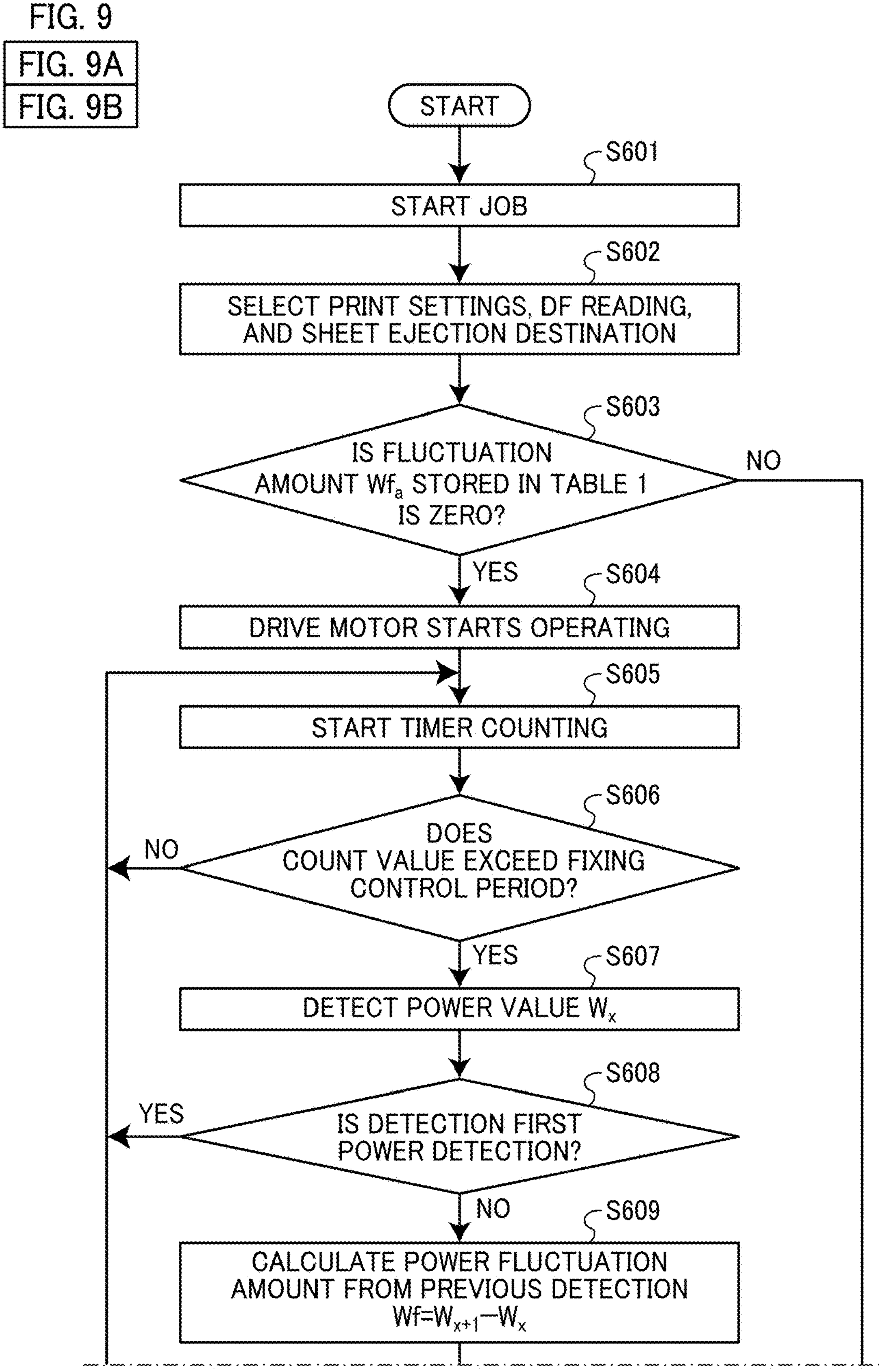
FIGS. 9A and 9B (FIG. 9) are a flowchart of an example of a flow of a process of calculating an amount of fluctuation in DC power in the image forming apparatus, according to Embodiment 2 of the present disclosure.
Figure 9B:
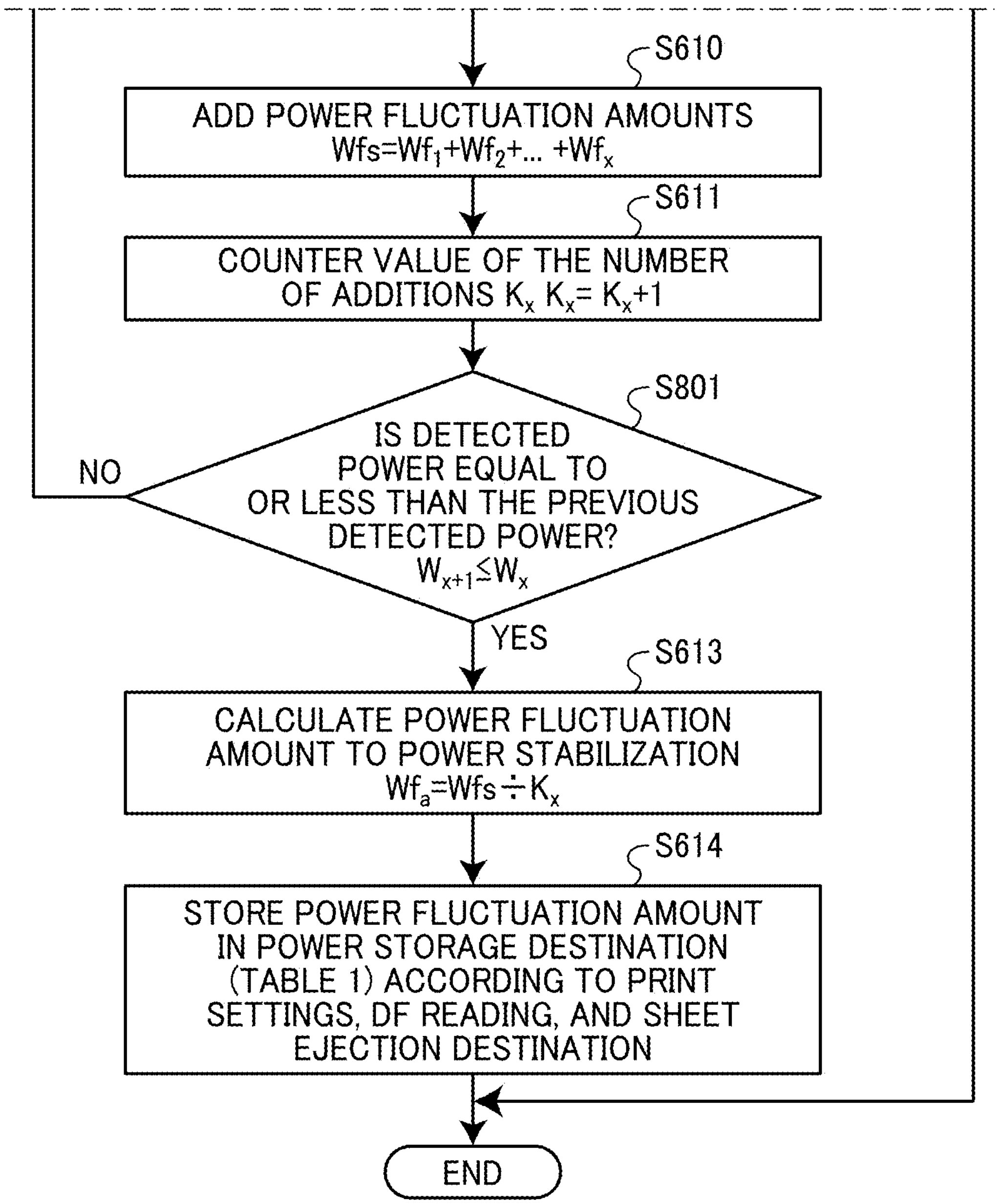

FIGS. 9A and 9B (FIG. 9) are a flowchart of an example of a flow of a process of calculating the amount of fluctuation in DC power in the image forming apparatus 1, according to Embodiment 2. In the present embodiment, after counting up the number of additions $K_x$, the calculation unit 202 determines whether the power value $W_{x+1}$ detected by the power detection circuit 104 is equal to or less than the previous power value $W_x$ (step S801).

When the power value $W_{x+1}$ is not equal to or less than the power value $W_x$ (step S801: No), the calculation unit 202 determines that the DC power supplied to the control board 20 is not stable. In this case, the process returns to step S605. By contrast, when the power value $W_{x+1}$ is equal to or less than the power value $W_x$ (step S801: Yes), the calculation unit 202 determines that the DC power supplied to the control board 20 is stable. In this case, the process proceeds to step S613.

Thus, the image forming apparatus 1 according to Embodiment 2 achieves the same effects as those in Embodiment 1.

Embodiment 3

The present embodiment relates a case in which the amount of fluctuation in DC power from the start of the printing operation until the stabilization of DC power is recalculated at preset time intervals. Redundant descriptions of the same configurations as those described above in Embodiment 1 and Embodiment 2 may be omitted below.

In the present embodiment, the calculation unit 202 recalculates the amount of fluctuation in DC power from the start of the printing operation until the stabilization of DC power at preset time intervals. Such a configuration can determine the power allocated to fixing in accordance with the device status, when the load fluctuation increases or decreases over time. For example, in a case where the load increases over time, the power allocated to fixing is determined such that the total of the primary-side AC power and the secondary-side DC power does not exceed the maximum power even in such a case. In a case the load decreases over time, the optimal power allocated to fixing is determined in accordance with the fluctuation.

Figure 10A:
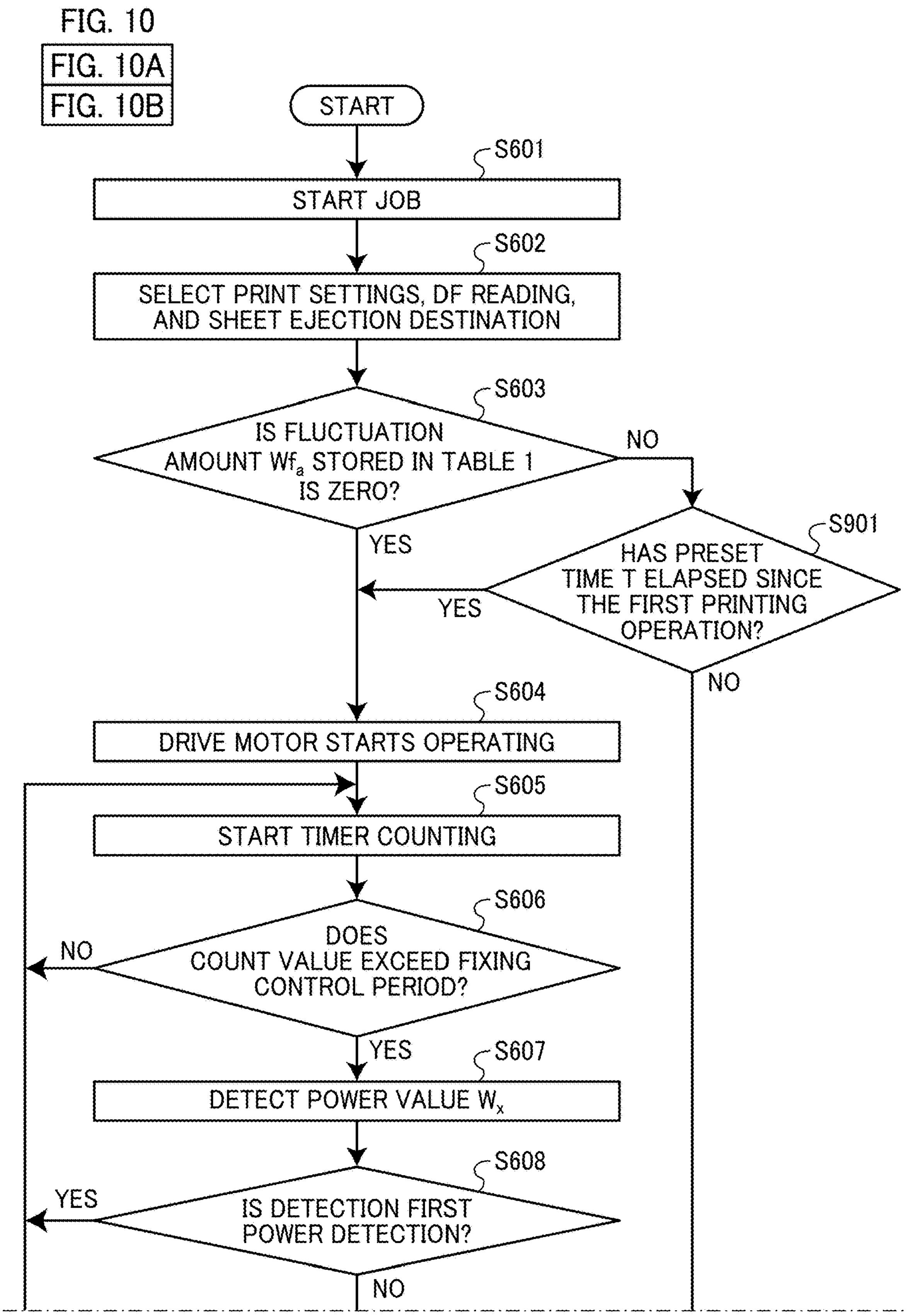
FIGS. 10A and 10B (FIG. 10) are a flowchart of an example of a flow of a process of calculating an amount of fluctuation in DC power in the image forming apparatus, according to Embodiment 3 of the present disclosure.
Figure 10B:
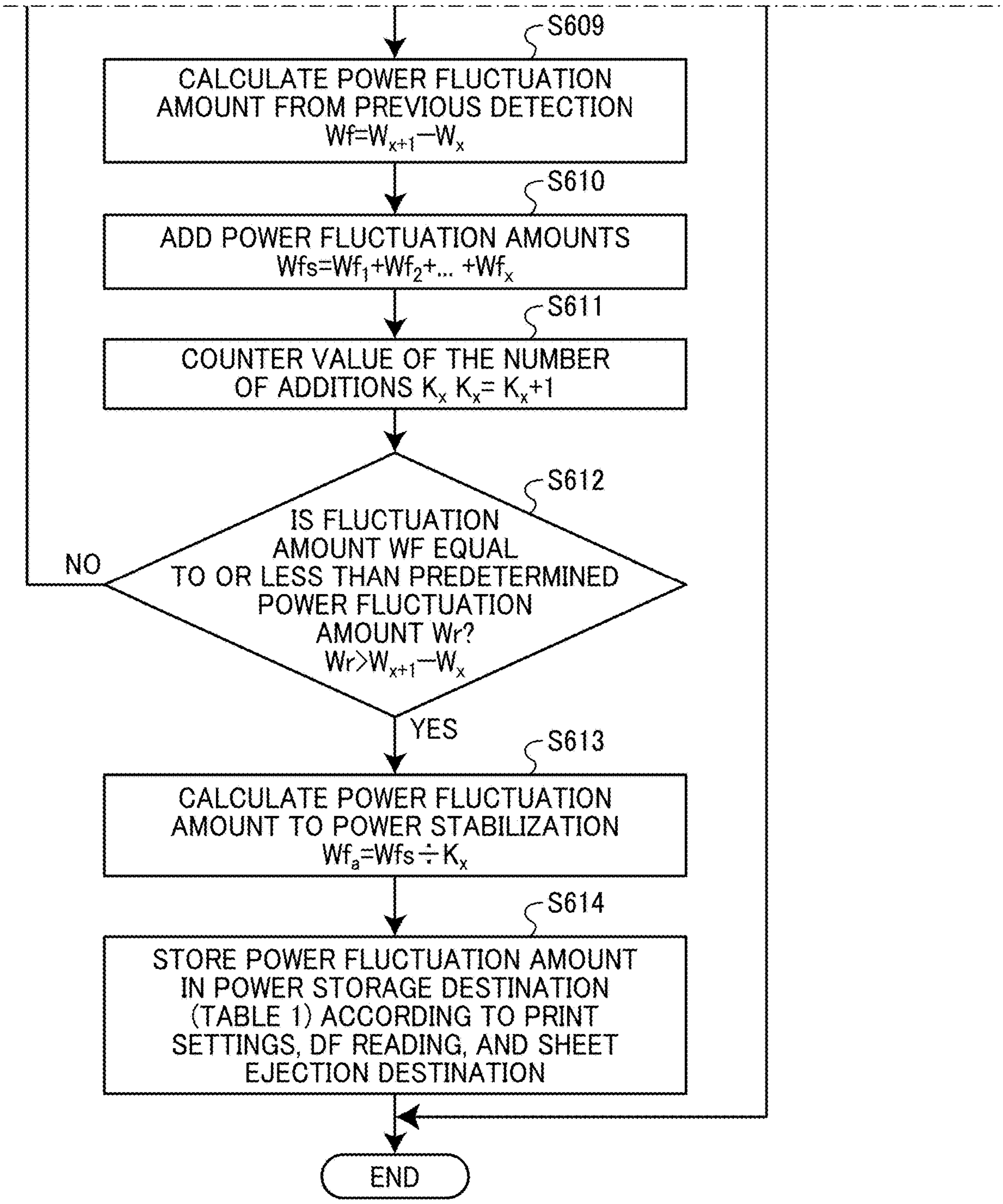

FIGS. 10A and 10B (FIG. 10) are a flowchart of an example of a flow of a process of calculating the amount of fluctuation in DC power in the image forming apparatus 1, according to Embodiment 3. In the present embodiment, when the amount of fluctuation $Wf_a$ in the selected print mode is stored (step S603: No), the calculation unit 202 determines whether a preset time T has elapsed since the first print operation in the selected print mode (or the last print operation in the selected print mode) (step S901).

When the calculation unit 202 determines that the preset time T has not elapsed since the first printing operation in the selected print mode (step S901: No), the calculation unit 202 does not recalculate the amount of fluctuation $Wf_a$. Then, the process of calculating the amount of fluctuation in the DC power ends. By contrast, when the calculation unit 202 determines that the preset time T has elapsed since the first printing operation in the selected print mode (step S901: Yes), the process proceeds to step S604.

Thus, when the load fluctuation increases or decreases over time, the image forming apparatus 1 according to Embodiment 3 can determine the power allocated to fixing in accordance with the device status. For example, in a case where the load increases over time, the power allocated to fixing is determined such that the total of the primary-side AC power and the secondary-side DC power does not exceed the maximum power even in such a case. In a case the load decreases over time, the optimal power allocated to fixing is determined in accordance with the load fluctuation.

A program executed by the image forming apparatus 1 according to the embodiments of the present disclosure is preinstalled and provided in, for example, the ROM 201*b*.

Alternatively or additionally, the program executed by the image forming apparatus 1 according to the embodiments of the present disclosure is stored in a computer-readable storage medium, such as a compact disc read-only memory (CD-ROM), a flexible disk (FD), a compact disc recordable (CD-R), and a digital versatile disc (DVD), in an installable or executable file format, to be provided.

Alternatively or additionally, the program executed by the image forming apparatus 1 according to the embodiments of the present disclosure is stored in a computer connected to a network such as the Internet and downloaded through the network, thus being providable. Alternatively or additionally, the program executed by the image forming apparatus 1 according to the embodiments of the present disclosure is provided or allocated via a network such as the Internet.

The program executed by the image forming apparatus 1 according to the embodiments of the present disclosure has a module configuration including the above-described components (the calculation unit 202 and the control unit 203). In terms of actual hardware, a processor such as the CPU 201*a* reads the program from the ROM 201*b* and executes the program, and thus the components are loaded onto a main memory and the calculation unit 202 and the control unit 203 is generated on the main memory.

Although, in the above embodiments, the description is provided is of a case in which the image forming apparatus 1 according to the embodiments is a multifunction peripheral having at least two of a copier function, a printer function, a scanner function, and a facsimile function, this is merely one example. In another example, aspects of this disclosure are applicable to any image forming apparatus such as a copier, a printer, a scanner, or a facsimile machine.

The technology in the related art works well when secondary-side DC is stable. However, the technology in the related art does not consider a time lag from detection at the start of printing when the secondary-side DC power fluctuates (e.g., the secondary-side DC power increases over time) to determination of power allocated for fixing. For this reason, if the power allocated to fixing is determined on the basis of the detection result of the DC power, there may be a time when the total of the primary-side AC power and the secondary-side DC power exceeds the maximum power in actual operation. Further, according to the technology in the related art, only a means for maximizing power allocated for fixing during a printing period is provided, and the power allocated for fixing is excessively reduced in the period from the start of paper feeding to the start of printing.

According to one or more embodiments of the present disclosure, power allocated to fixing is determined by correcting the power fluctuation at the start of printing with a linear form obtained from a power detection result in the first printing operation, so that the total of the primary-side AC power and the secondary-side DC power does not exceed the maximum power in the actual printing operation.

A description is now given of some aspects of the present disclosure.

Aspect 1

According to Aspect 1, a power control apparatus includes a power detection unit configured to DC power converted from AC power supplied from a power supply and to be supplied to a control board.

The power control apparatus includes a calculation unit configured to, in a case that a first printing operation is performed in an image forming apparatus, calculate fluctuations in the DC power in each preset control period from a start of a printing operation until stabilization of the DC power.

The power control apparatus includes a control unit configured to, in a case that a printing operation subsequent to the first printing operation is performed in the image forming apparatus, determine allocation of the AC power to a fixing device of the image forming apparatus in a next preset control period based on power obtained by adding, to the DC power, an average of the fluctuations in a plurality of preset control periods.

Aspect 2

According to Aspect 2, the power control apparatus of Aspect 1 further includes a storage unit configured to store the fluctuations calculated in each preset control period by the calculation unit.

Aspect 3

According to Aspect 3, in the power control apparatus of Aspect 1 or 2, the calculation unit determines that the DC power is stabilized after the start of the printing operation in a case that the fluctuations are within a predetermined amount of power fluctuation.

Aspect 4

According to Aspect 4, in the power control apparatus of Aspect 1 or 2, the calculation unit determines that the DC power is stabilized after the start of the printing operation in a case that the DC power is lower than DC power in a previous control period.

Aspect 5

According to Aspect 5, in the power control apparatus of any one of Aspects 1 to 4, the calculation unit calculates the fluctuations for a plurality of printing conditions, respectively, the plurality of printing conditions having different power consumption patterns at the start of the printing operation, respectively.

Aspect 6

According to Aspect 6, in the power control apparatus of any one of Aspects 1 to 5, the calculation unit recalculates the fluctuations at preset period intervals.

Aspect 7

According to Aspect 7, an image forming apparatus includes the power control apparatus of any one of Aspects 1 to 6.

Aspect 8

According to Aspect 8, a power control method performed by a power control apparatus includes detecting DC power converted from AC power supplied from a power supply and to be supplied to a control board.

The power control method includes in a case that a first printing operation is performed in an image forming apparatus, calculating fluctuations in the DC power in each preset control period from a start of a printing operation until stabilization of the DC power.

The power control method includes, in a case that a printing operation subsequent to the first printing operation is performed in the image forming apparatus, determining allocation of the AC power to a fixing device of the image forming apparatus in a next preset control period based on power obtained by adding, to the DC power, an average of the fluctuations in a plurality of preset control periods.

Aspect 9

According to Aspect 9, a program causes one or more processors to function as a calculation unit configured to acquire a result of detecting DC power converted from AC power supplied from a power supply and to be supplied to a control board, and to, in a case that a first printing operation is performed in an image forming apparatus, calculate fluctuations in the DC power in each preset control period from a start of a printing operation until stabilization of the DC power.

The program causes the one or more processors to function as a control unit configured to, in a case that a printing operation subsequent to the first printing operation is performed in the image forming apparatus, determine allocation of the AC power to a fixing device of the image forming apparatus in a next preset control period based on power obtained by adding, to the DC power, an average of the fluctuations in a plurality of preset control periods.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A power control apparatus, comprising:

a power detection circuit to detect direct current (DC) power converted from alternating current (AC) power supplied from a power supply and to be supplied to a control board of an image forming apparatus; and circuitry configured to:

in response to a first printing operation performed by the image forming apparatus, calculate fluctuations in the DC power in each preset control period from a start of the first printing operation until stabilization of the DC power; and in response to a printing operation subsequent to the first printing operation performed by the image forming apparatus, determine allocation of the AC power to a fixing device of the image forming apparatus in a next preset control period based on power obtained by adding, to the DC power, an average of the fluctuations in a plurality of preset control periods.

2. The power control apparatus of claim 1, further comprising a memory that stores the fluctuations calculated in each preset control period.

3. The power control apparatus of claim 1, wherein the circuitry is configured to determine that the DC power is stabilized after the start of the printing operation in a case that a fluctuation obtained by subtracting the DC power from DC power in a previous control period is within a predetermined amount of power fluctuation.

4. The power control apparatus of claim 1, wherein the circuitry is configured to determine that the DC power is stabilized after the start of the printing operation in a case that the DC power is lower than DC power in a previous control period.

5. The power control apparatus of claim 1, wherein the circuitry is configured to calculate the fluctuations for a plurality of printing conditions, respectively, the plurality of printing conditions having different power consumption patterns at the start of the printing operation, respectively.

6. The power control apparatus of claim 1, wherein the circuitry is configured to recalculate the fluctuations at preset period intervals.

7. An image forming apparatus, comprising:

an image forming device to form an image; and the power control apparatus of claim 1.

8. A power control method performed by a power control apparatus, the power control method comprising:

detecting DC power converted from AC power supplied from a power supply and to be supplied to a control board of an image forming apparatus;

in response to a first printing operation performed by the image forming apparatus, calculating fluctuations in the DC power in each preset control period from a start of the first printing operation until stabilization of the DC power; and in response to a printing operation subsequent to the first printing operation performed by the image forming apparatus, determining allocation of the AC power to a fixing device of the image forming apparatus in a next preset control period based on power obtained by adding, to the DC power, an average of the fluctuations in a plurality of preset control periods.

9. A non-transitory computer-executable medium storing a plurality of instructions which, when executed by one or more processors, cause the one or more processors to perform a power control method comprising:

acquiring a result of detecting DC power converted from AC power supplied from a power supply and to be supplied to a control board of an image forming apparatus;

in response to a first printing operation performed by the image forming apparatus, calculating fluctuations in the DC power in each preset control period from a start of the first printing operation until stabilization of the DC power; and in response to a printing operation subsequent to the first printing operation performed by the image forming apparatus, determining allocation of the AC power to a fixing device of the image forming apparatus in a next preset control period based on power obtained by adding, to the DC power, an average of the fluctuations in a plurality of preset control periods.

* * * * *